United States Patent [19]

Greene

[11] Patent Number: 4,617,244
[45] Date of Patent: Oct. 14, 1986

[54] ADDITIVE FOR ELECTROLYTE OF LEAD-ACID BATTERIES

[76] Inventor: Roland M. Greene, 3575 S. Main, Nibley, Utah 84321

[21] Appl. No.: 747,927

[22] Filed: Jun. 24, 1985

[51] Int. Cl.⁴ .............................................. H01M 6/04
[52] U.S. Cl. .................................... 429/203; 429/198; 429/205
[58] Field of Search ......................... 429/198, 203, 205

[56] References Cited

U.S. PATENT DOCUMENTS 3,281,281 10/1966 Schaefer ........................ 429/198 X

FOREIGN PATENT DOCUMENTS 2106386 4/1983 United Kingdom .

OTHER PUBLICATIONS

Masterson et al, *Chemical Principles*, W. B. Saunders Co., Philadelphia et al, 1969, p. 407, 427.
Howard et al., "Battery Additives" NBS Circular 504, Jan. 10, 1951, pp. 5, 6, 25, 26.
Derwent Abstracts C84-003773 (Nov. 28, 1983) C83-029507 (Feb. 18, 1983) and 82-77380 (Aug. 4, 1982).
Chemical Abstract 82:154404.

*Primary Examiner*—Brian E. Hearn
*Assistant Examiner*—Stephen J. Kalafut

[57]   ABSTRACT

A new type of additive to be added to the electrolyte of lead-acid storage batteries to improve their operation, such as chargeability and startability, comprising a mixture of an iron chelate and a magnesium salt or chelate.

9 Claims, No Drawings

ADDITIVE FOR ELECTROLYTE OF LEAD-ACID BATTERIES

BACKGROUND OF THE INVENTION

1. Field of the Invention

This invention relates to a new type of additive for the electrolyte of lead-acid storage batteries. More particularly, the invention relates to new additives for the electrolyte of lead-acid storage batteries which greatly improve the efficiency of the operation of the said batteries.

Specifically, the invention provides a new type of additive composition to be added to the electrolyte of lead-acid storage batteries which greatly improves their operation, particularly as to chargeability, startability, especially at the low operating temperatures, and reduces gasing effect and corrosion at the battery poles, said additive comprising a mixture of an iron chelate and a magnesium salt or chelate, preferable contained in an aqueous solution.

The invention further provides a preferred method for preparing the new additives comprising adding a substantially water-soluble chelating agent, e.g. one prepared from a donor group containing O or N, and an iron salt, and preferably ferrous sulfate, to water so as to effect formation of an iron chelate and then adding the magnesium salt or chelate to the aqueous solution.

2. Prior Art

Lead-acid storage batteries are commonly used through out the world in various types of automobiles, carts and trucks. While they are highly effective in most climates, their use in the colder climates has certain limitations. It has been found, for example, that when temperatures are lowered to certain levels, they become sluggish and difficult to operate. This renders the automobile or truck difficult to start without the use of special charging equipment. In addition, the batteries have problems in the hot climates, wherein the gasing effect causes corrosion of the battery terminals and cables which shorts out the battery.

Furthermore, many of the lead-acid batteries are now being used on golf carts, trucks, toys and recreation vehicles where there is no source of regeneration, and it is necessary to recharge the batteries after a period of time. Such recharging is time consuming and expensive.

Finally, such batteries have limited source of energy and in many cases are accidently discharged leaving the operator stranded. The only solution at the present has been to take the battery to a location where it can be recharged or to replace the battery with one that has been charged. This in many cases causes expensive delays.

Various additives have been suggested for addition to the electrolyte to solve many of these problems. In all such cases, however, the additive has had little or no effect or has caused additional problems in the operation of the batteries. For example, such additives have included metal salts but these have in many cases given only slight improvement in activity, or have given only temporary increase of activity, and subsequently have caused contamination of the lead plates and premature loss of activity.

It is an object of the invention, therefore, to provide a new and improved additive for increasing the efficiency of lead-acid batteries. It is a further object to provide new additives for the electrolyte of lead-acid batteries which increases the efficiency of the said batteries, particularly during the colder temperatures. It is a further object to provide new additive compositions for electrolyte of lead-acid batteries which increase the rate of charging said batteries. It is a further object to provide new additive compositions which increases efficiency of both old and new type lead-acid batteries. It is a further object to provide new additive compositions for electrolyte of lead-acid batteries which causes a decrease in the gasing effect and thereby reduces possibility of corrosion of the terminates and cables. It is a further object to provide additives for the electrolyte of lead-acid batteries which increases the period of activity of the said battery over a wide range of temperature conditions. These and other objects of the invention will be apparent from the following detailed description thereof.

SUMMARY OF THE INVENTION

It has now been discovered that these and other objects may be accomplished by the new additive compositions of the present invention comprising a mixture of an iron chelate and a magnesium salt or chelate, preferably where the iron and magnesium are in a mole ratio varying from 0.1:1 to 2;1, said mixture preferably being contained in an aqueous solution.

It has been surprisingly found that the above-described additive composition imparts unexpected and superior properties to the lead-acid battery when added to the electrolyte thereof. It has been found, for example, that when the additive is added to the conventional sulfuric acid electrolyte of a new uncharged battery, the time to charge the battery to full charge is surprisingly reduced, even to about $\frac{1}{2}$ the time normally required to charge the battery. It has been further found that batteries containing the new additive have surprising increase in efficiency of operation, even at the very low temperatures at which normal batteries are very sluggish or totally inactive. It has been found, for example, that batteries containing the additive show excellent activity even at temperatures as low as $-30°$ F. and are able to give instantaneous activity to start automobiles at that low temperature where the normal batteries take several minutes of sluggish activity to start the automobile. Further unexpected advantage is found in the fact that the new additive greatly reduces the gasing effect i.e. release of bubbles of gas at the terminal plates, which thereby reduces the formation of corrosion at the terminals or cables of the battery. It has also been found that the new additive renders the battery more resilient on unexpected discharge as such batteries, when left to stand for a period of time, recharge themselves to a point where they regain part of their lost efficiency. Batteries containing the new additive also demonstrate much longer life span than those which do not contain the additive but contain only the conventional 35% sulfuric acid electrolyte.

DETAILED DESCRIPTION OF THE INVENTION

The new additives of the present invention comprise a mixture of an iron chelate and a magnesium salt or chelate, preferably wherein the iron and magnesium are in a mole ratio varying from 0.1:1 to 2:1 and said mixture preferably being contained in an aqueous solution.

The iron chelate may be obtained by reacting any iron salt with any suitable chelating agent, i.e. any material known to form complexes or coordination compounds with the iron ions. The electron-pair bonding formed between the electron accepting iron and the electron-donating chelating agent may be essentially ionic or essentially covalent depending on the donor atoms involved. The preferred chelating agents are those having donor groups containing non-metallic elements of Groups V and VI of the Periodic Table of Elements, and those containing N and O are the most common examples.

Examples of such chelating agents include, among others, the acid, such as malonic acid, diethylmalonic acid, isopropylmalonic acid, oxalic acid, o-phthalic acid, succinic acid, maleic acid, citraconic acid; amines, such as ethylenediamine, N,N'-dimethylethylene diamine, diethylenetriamine, triethylenetetramine, propylenediamine, triaminotriethylamine; aromatic amines, such as bipyridyl, phenathroline, 5-chloro-1,10-phenanthroline, 5-phenyl-1,10-phenanthroline,; natural amines and peptides, such as alanine, glycylalanine, asparagine, aspartic acid, glycine, glycylglycine, glutamic acid, histidine, leucine, methionine, phenylalanine, proline, tryptophan, tryrosine, valine; amino acids, such as beta-alanine-N,N-diacetic acid, 2-aminobenzoic acid, N,N'diacetic acid, beta-aminoethylphosphinic acid, N,N-diacetic acid, ammoniadiacetic acid, ammoniatripropionic acid, anilinediacetic acid, 2-sulfoanilinediacetic acid, 1,2-diaminocyclohexane-N,N'-tetraacetic acid, ethylenediamine-N,N'diacetic acid, ethylenediamine tetracetic acid, N-benzylethylenediaminetriacetic acid, ethylenediaminedipropionic acid, ethylenediaminetetrapropionic acid, glycine-N-propionic acid, trimethylenediamine tetracetic acid, tetramethylenediamine tetraacetic acid, pentamethylenediamine tetracetic acid; hydroxy-substituted acids, such as citric acid, lactic acid, salicyclic acid, tartaric acid; condensate phoshates, nitro acids, salicyaldehydes and derivatives, beta-ketones and derivatives, phenols, such as 3,5-disulfophyrocatechol, 8-hydroxyquinoline, and various porphyrins, such as protoporphyrin, dihistidine protoporphyrin, dipyridine protoporphyrin, various globins, and other heme proteins, enzymes and the like.

Particularly preferred are the organic chelating agents, i.e. those having the donor groups within an organic group or groups, and ones which form 4 to 6 membered rings with the iron, and which contain N and/or O groups, such as amine, acid, phenol or aldehyde groups.

Coming under special consideration are the aliphatic amines containing up to 25 carbon atoms, and particularly the special alkylene amine alkanoic acids, such as for example, ethyleneamine acetic acids, such as diethylene diamine tetracetic acid, trimethylene diamine tetracetic acid, diethylene diamine tetrapropionic acid, and tetraethylene diamine tripropionic acid. Coming under particularly concern because of the superior results obtained therewith are the polyalkylene polyamine polyalkanoic acids containing up to 18 carbon atoms.

The iron salt used in the preparation of the iron chelates may be any suitable ferrous or ferric salt, such as a sulfate, oxalate, phosphate, citrate, phthalate, and the like, but is preferrable a ferrous salt, such as a sulfate, oxalate or citrate salt. Coming under special consideration is ferrous sulfate and its various forms such as ferrous sulfate heptahydrate.

The magnesium salt used in the preparation of the new additives of the present invention may be any suitable water soluble salt, such as magnesium sulfate, magnesium chloride, magnesium chromate, magnesium perchlorate, magnesium thiosulfate, and the like. Particularly preferred is magnesium sulfate and its various forms as now available.

The magnesium may also be added in the form of a chelate. The magnesium chelate may be prepared in the same manner as described above for the preparation of the iron chelate with the exception that a magnesium salt may be used in place of the iron salts. Particularly preferred magnesium salts to be used in this case include, among others, the sulfate, oxalate, phosphate, citrate, phthalate, and the like salts.

The iron chelate and the magnesium salt or chelate are combined by merely mixing the two components together in a suitable range of proportions. In general, the two components are combined so as to have the iron and the magnesium in a mole ratio varying from about 0.1:1 to 2:1, and more preferably in a ratio of 0.33:1.

While the additives of the invention may be prepared by mixing preformed solid iron chelate with the solid magnesium salt or chelate, and using the powdered mixture as the additive, the additive is more preferably prepared as an aqueous solution according to the following preferred preparation method.

The desired chelating agent as described above is preferably added to distilled water to form an aqueous solution thereof and the desired iron salt added thereto so as to form the iron chelate. The amount of the chelate added is preferably such as to form a complex with all of the iron in the iron salt. While the formation is completed at room temperature, heat may be applied so as to speed the formation of the complex. Preferably the mixture is heated to about 150° F. to speed the reaction and bring about more complete complexing.

The desired magnesium salt or chelate is then added to the aqueous solution containing the iron chelate. The amount added should be sufficient to maintain the iron and magnesium in the desired mole ratio as noted above.

While the aqueous solution of the mixture can be used directly as the new additive, it is sometimes desirable to add some aqueous sulfuric acid, e.g. 35% sulfuric acid as contained in conventional battery electrolytes, to effect dilution of the additive composition before being added to the battery.

The new additive compositions of the invention prepared as noted above are then added directly to the electrolyte of each of the cells of the lead-acid storage batteries. The amount added to each cell may vary over a wide range depending upon the type of battery, age of the battery and desired results. When employing the additives added as an aqueous solution, as prepared above, one preferably adds from about 1.25 to 2 U.S. fluid ounces of the prepared solution to each of the cells.

After the additive has been added directly to the electrolyte of each cell, the battery may then be put into operation in the auto, truck, etc. as the effect of the additive appears almost instantaneous. While the mechanism involved is not understood, it has been projected that the chelate mixture greatly facilitates the passage of the current through the electrolyte and thereby increases the efficiency of operation as noted above.

To illustrate the manner in which the invention may be carried out, the following examples are given. It is to be understood, however, that the examples are given in the way of illustration and are not to be regarded as limiting the invention in any way.

EXAMPLE I

This example illustrates the preparation of the new additive of the invention, and its use in increasing the efficiency of a lead-acid storage battery.

0.8 Grams of ethylene diamine tetracetic acid (0.0027 moles) was added to 169.7 grams of distilled water (9.43 moles). This mixture was stirred and then 3.0 grams (0.02 moles) of ferrous sulfate heptahydrate was added to the mixture. The combined mixture was stirred at room temperature until the components had dissolved. 7.0 Grams (0.058 moles) of magnesium sulfate was added to the mixture which was stirred at room temperature. The mixture was then added to a new container and 133 grams of 35% sulfuric acid added. The resulting solution making up the new electrolyte additive appeared as a fluid substantially clear liquid (appox. 302 cc).

The use of the above prepared additive solution to increase the chargeability of lead-acid storage batteries is illustrate in the following experiment.

Two new 12 volt 6 cell lead-sulfuric acid storage batteries were obtained without the electrolyte. To both batteries was added the standard 35% sulfuric acid solution allowing room at the top of each of the cells of one of the batteries (Battery A) for the addition of the additive, while the acid solution was added to the top of each of the cells of the other battery (Battery B). 1.5 U.S. fluid ounces (44 cc) of the additive prepared above was then added to each of the cells of Battery A. Both batteries were then subject to charge. Battery B without the additive was fully charged in 7 hours, while Battery A with the additive was fully charged in only 2½ hours.

EXAMPLE II

This example illustrates the ability of the new additives of the present invention to increase the startability of the storage batteries at low temperatures.

9 Fluid ounces of the new additive was prepared as shown in Example I above. 1.5 Fluid ounces of this solution was added to each of the cells of a new 12 volt 6 cell lead-sulfuric acid storage battery which had been fully charged (Battery A). Another new 12 volt 6 cell lead-sulfuric acid battery containing standard 35% sulfuric acid electrolyte without additive (Battery C) was also fully charged. Both batteries were placed in automobiles and maintained for 48 hours at an average temperature of about $-15°$ C. Attempts were then made to start both automobiles. The automobile containing Battery A with the additive added started immediately, while the automobile containing Battery C without the additive barely started after about 3 minutes.

EXAMPLE III

This example further illustrates the ability of the new additives to increase the startability of the storage batteries at low temperatures.

9 Fluid ounces of the new additives was prepared as shown in Example I above. 1.5 Fluid ounces of this solution was added to each of the cells of a 1 year old 12 volt 6 cell lead-sulfuric acid storage battery containing conventional 35% sulfuric acid electrolyte and was fully charged (Battery B). Another 1 year old 12 volt 6 cell lead-sulfuric acid battery containing standard 35% sulfuric acid electrolyte without additive (Battery D) was also fully charged. Both batteries were placed in automobiles and maintained 24 hours at an average temperature of $-30°$ C. Attempts were then made to start both automobiles. The automobile containing Battery B with the additive started immediately even at that low temperature. The automobile containing Battery D reacted very sluggishly and finally started after about 2 minutes.

EXAMPLE IV

This example illustrates the ability of the new additives of the invention to rate of recoverability of the power of a storage battery on complete discharge.

9 Fluid ounces of the new additive was prepared as shown in Example I. 1.5 Fluid ounces of this solution was added to a new 12 volt 6 cell lead-sulfuric acid storage battery which had been fully charged (Battery A). This battery was placed in an automobile and discharged by leaving the lights on for 6.5 hours. At that time the battery was discharged and unable to start the automobile. The lights were turned off and the automobile allowed to stand idle for 2 hours. At that time attempt was made to start the automobile, and the battery responded immediately to start the car as if it was fully charged.

EXAMPLE V

This example illustrates the essential nature of the components of the new additives of the present invention.

An additive was prepared without the use of the chelating agent by adding 3.0 grams of ferrous sulfate heptahydrate, 7.0 grams of magnesium sulfate to 6.0 ounces of water and 35% sulfuric acid added to bring the total to 9 fluid ounces. 1.5 fluid ounces of this mixture was added to the cells of a new 12 volt 6 cell lead-acid storage battery. The battery was then subject to charge and required over 5 hours to reach a full charge. The related battery in Example I containing the additive with the chelating agent was fully charged in only 2.5 hours.

I claim as my invention:

1. A lead-acid storage battery containing as an electrolyte for each cell, an aqueous sulfuric acid solution containing an activating amount of an additive comprising a mixture of an iron chelate and a magnesium salt or chelate, the chelates for the iron and magnesium being formed from chelating agents which form 4 to 6 membered rings with the iron and magnesium and which contain a member of the group consisting of amine groups, phenol groups and aldehyde groups.

2. A lead-acid storage battery as defined in claim 1 wherein the mixture contains the iron and magnesium in a mole ratio of 1:1 to 2:1.

3. A lead-acid storage battery as defined in claim 1 wherein the iron chelate is a chelate of iron and a polyalkylene polyamine polyalkanoic acid.

4. A lead-acid storage battery as defined in claim 1 wherein the iron chelate is a chelate of iron and a polyethylene polyamine polytetracetic acid.

5. A lead-acid storage battery as defined in claim 1 wherein the iron chelate is a chelate of iron and ethylene diamine tetracetic acid.

6. A lead-acid storage battery as defined in claim 1 wherein the magnesium salt is magnesium sulfate.

7. A lead-acid storage battery as defined in claim 1 wherein the additive is prepared by adding a chelating agent and an iron salt to water and then adding a substantially water-soluble magnesium salt or chelate, and combining this mixture with an aqueous sulfuric acid solution.

8. A lead-acid storage battery as defined in claim 1 wherein the chelating agent is an alkylene polyamine polyalkanoic acid.

9. A lead-acid storage battery as in claim 1 wherein the additive is one containing a chelate of iron and a polyalkylene polyamine polyalkanoic acid and magnesium sulfate.

* * * * *